(12) United States Patent
Ueda et al.

(10) Patent No.: US 7,539,408 B2
(45) Date of Patent: May 26, 2009

(54) SINGLE-LENS REFLEX CAMERA SYSTEM

(75) Inventors: Hiroshi Ueda, Osaka (JP); Makoto Azuma, Tokushima (JP); Kaoru Mokunaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 373 days.

(21) Appl. No.: 11/478,422

(22) Filed: Jun. 29, 2006

(65) Prior Publication Data
US 2007/0003269 A1   Jan. 4, 2007

(30) Foreign Application Priority Data
Jul. 1, 2005   (JP) ............................. 2005-193370

(51) Int. Cl.
*G03B 7/085*   (2006.01)
*G03B 7/095*   (2006.01)
*G03B 17/18*   (2006.01)
*G03B 9/02*    (2006.01)
*G03B 17/00*   (2006.01)

(52) U.S. Cl. .................... 396/257; 396/281; 396/299; 396/505

(58) Field of Classification Search .............. 396/89, 396/91, 257, 238, 299, 281, 505; 348/335, 348/341, 372; 359/740
See application file for complete search history.

(56) References Cited

U.S. PATENT DOCUMENTS

| 4,104,650 | A | * | 8/1978 | Hosoe et al. ................ 396/91 |
| 5,410,432 | A | * | 4/1995 | Kobayashi ................ 359/740 |
| 5,761,554 | A | * | 6/1998 | Kirigaya et al. ............ 396/299 |
| 5,895,133 | A | * | 4/1999 | Hirai ......................... 396/238 |
| 2001/0026683 | A1 | * | 10/2001 | Morimoto et al. ............ 396/89 |

FOREIGN PATENT DOCUMENTS

JP   7-311405   11/1995

* cited by examiner

*Primary Examiner*—Melissa J Koval
(74) *Attorney, Agent, or Firm*—Hamre, Schumann, Mueller & Larson, P.C.

(57) ABSTRACT

The single-lens reflex camera body is provided with: a detector that detects which of a first lens unit or a second lens unit is attached; a rotation operator which accepts a rotating operation to adjust a diaphragm value of the lens unit attached to the camera body; and a controller which transmits the diaphragm value that is adjusted at the rotation operator to the lens unit attached to the single-lens reflex camera body, and having a configuration where an operating direction of the diaphragm ring when a rotating operation is performed at the diaphragm ring to adjust the diaphragm value is the same as an operating direction of the rotation operator when the rotating operation is performed at the rotation operator. Thereby, the diaphragm value can be set easily.

6 Claims, 13 Drawing Sheets

(a) 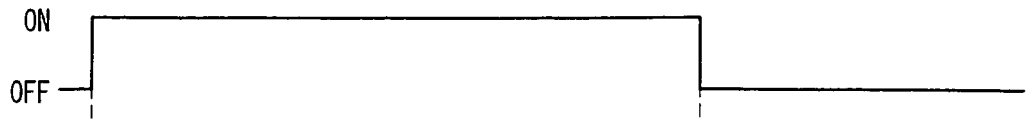

(b) 

(c) 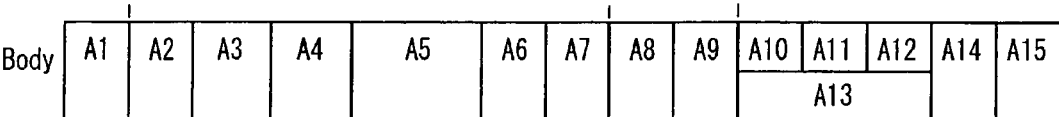

(d) 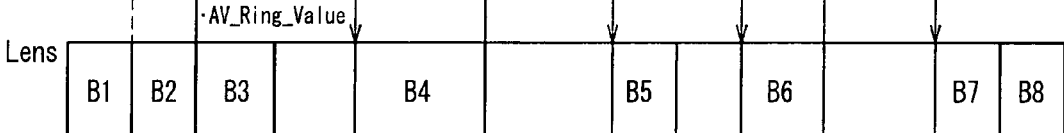

(e)

| | | | | |
|---|---|---|---|---|
| A1 | : Operation pausing | | B1 | : Operation pausing |
| A2 | : Startup process | | B2 | : Startup processing |
| A3 | : Lens communication | | B3 | : Body communication |
| A4 | : Focus detection | | B4 | : Focusing lens driving |
| A5 | : Wating until focusing lens driving stops | | B5 | : Diaphragm driving |
| A6 | : Focus detection | | B6 | : Diaphragm opening driving |
| A7 | : Waiting for S2 | | B7 | : Sleep processing |
| A8 | : Mirror up | | B8 | : Sleep |
| A9 | : Exposure to light | | | |
| A10 | : Reading out image data | | | |
| A11 | : Image processing | | | |
| A12 | : Image display data memory | | | |
| A13 | : Mirror down, shutter charge | | | |
| A14 | : Operation pausing processing | | | |
| A15 | : Operation pausing | | | |

FIG. 3

SINGLE-LENS REFLEX CAMERA SYSTEM

BACKGROUND OF THE INVENTION

1. Field of the Invention

The present invention relates to a single-lens reflex camera system n which an image pickup lens can be changed, and particularly relates to a setting and a control of a diaphragm value during photographing.

2. Description of Related Art

Among the conventional single-lens reflex camera systems, there was a system in which a photographing diaphragm value is set in an operator that is mounted on a single-lens reflex camera body (hereinafter, called a body unit), and also there was a system in which the photographing diaphragm value is set in an operator mounted on a lens unit that is changeable with respect to the body unit.

In the system in which various kinds of operations are performed in an operator that is mounted on the body unit, the setting of the diaphragm value in a diaphragm driving mechanism that is mounted on the lens unit is performed in the operator in the body, and thus the photographer may be confused until he/she becomes accustomed to the operations. Whereas, in the system in which the diaphragm value is set in the operator that is mounted on the lens unit, the diaphragm driving mechanism and the operator are mounted on the lens unit, and thus the photographer is not likely to be confused as mentioned above.

Moreover, conventionally, considering the compatibility with the system in which the diaphragm value can be set in the lens unit, some systems in which the diaphragm value also can be set in the operator in the body unit exist. However, in such systems, since the diaphragm driving mechanism and a diaphragm value setting portion in the lens unit are linked mechanically, there are problems in that the setting may be limited (for example, the diaphragm value setting portion must be provided at a certain position in the lens unit), or the operation may be complicated.

JP 7(1995)-311405 A discloses a technique that improves the operation of the diaphragm setting by providing the diaphragm value setting portion in the lens unit.

However, in the configuration disclosed in JP 7(1995)-311405 A, there is a problem in that, when the lens unit that does not include the diaphragm value setting portion is attached to the body, the diaphragm value cannot be set. For example, there is a problem of incapability of photographing in a diaphragm priority mode.

SUMMARY OF THE INVENTION

Therefore, with the foregoing in mind, it is an object of the present invention to enable to set the diaphragm value easily, even in the case where the lens unit on which the operator that is capable of diaphragm adjustment, such as a diaphragm ring, is not mounted is attached to the body unit.

In order to attain the above-mentioned object, the single-lens reflex camera body of the present invention has a configuration to which a first lens unit provided with a diaphragm ring that is capable of adjusting a diaphragm value by a rotating operation, and a second lens unit that is not provided with the diaphragm ring can be attached/detached selectively, the single-lens reflex camera body comprising: a rotation operator which accepts a rotating operation to adjust a diaphragm value of the first lens unit or the second lens unit that is attached to the single-lens reflex camera body; and a controller which transmits the diaphragm value that is adjusted at the rotation operator to the first lens unit or the second lens unit that is attached to the single-lens reflex camera body, and having a configuration where an operating direction of the diaphragm ring when a rotating operation is performed at the diaphragm ring to adjust the diaphragm value is the same as an operating direction of the rotation operator when the rotating operation is performed at the rotation operator.

Moreover, the lens unit of the present invention is capable of being attached/detached with respect to the single-lens reflex camera body and capable of performing data communication with the single-lens reflex camera body, the lens unit comprising: a diaphragm portion that is disposed on an optical axis of an incident optical image, and can limit a light amount to be passed through; and a diaphragm setting portion that controls to drive the diaphragm portion, based on data of the diaphragm value transmitted from the single-lens reflex camera body.

Furthermore, the single-lens reflex camera system of the present invention is a single-lens reflex camera system comprising a single-lens reflex camera body and a lens unit, wherein the single-lens reflex camera body comprising: a rotation operator which accepts a rotating operation to adjust a diaphragm value of a first lens unit or a second lens unit that is attached to the single-lens reflex camera body; and a controller which transmits the diaphragm value that is adjusted at the rotation operator to the first lens unit or the second lens unit that is attached to the single-lens reflex camera body, and having a configuration where an operating direction of a diaphragm ring when a rotating operation is performed at the diaphragm ring to adjust the diaphragm value is the same as an operating direction of the rotation operator when the rotating operation is performed at the rotation operator, the lens unit being the first lens unit provided with the diaphragm ring that is capable of adjusting a diaphragm value by a rotating operation; or the second lens unit that is not provided with the diaphragm ring, being capable of being attached/detached with respect to the single-lens reflex camera body and capable of performing data communication with the single-lens reflex camera body, and comprising: a diaphragm portion that is disposed on an optical axis of an incident optical image, and can limit a light amount to be passed through; and a diaphragm setting portion that controls to drive the diaphragm portion, based on the diaphragm value transmitted from the single-lens reflex camera body.

These and other advantages of the present invention will become apparent to those skilled in the art upon reading and understanding the following detailed description with reference to the accompanying figures.

BRIEF DESCRIPTION OF THE DRAWINGS

FIG. 3 is a time chart showing a flow of photographing operations of the single-lens reflex camera system.

DETAILED DESCRIPTION OF THE INVENTION

The single-lens reflex camera body of the present invention preferably has a configuration where, comprising a detector that detects which of the first lens unit or the second lens unit is attached to the single-lens reflex camera body, wherein, when the detector detects that the second lens unit is attached to the single-lens reflex camera body, the controller transmits a diaphragm value that is adjusted at the rotation operator to the second lens unit that is attached to the single-lens reflex camera body.

Moreover, the single-lens reflex camera body of the present invention preferably has a configuration where, comprising a displaying portion, wherein, when the rotation operator accepts the rotating operation for adjusting the diaphragm value, the displaying portion displays an image showing an appearance of the diaphragm ring.

Furthermore, the single-lens reflex camera body of the present invention preferably has a configuration further including an automatically setting mode to calculate the diaphragm value by at least a light amount of the subject to be photographed or a setting of a shutter speed, wherein the automatically setting mode can be selected at the rotation operator.

According to the present invention, the operability in diaphragm adjustment can be improved.

EMBODIMENT 1

[Entire Configuration and Operation]

Figure 1:
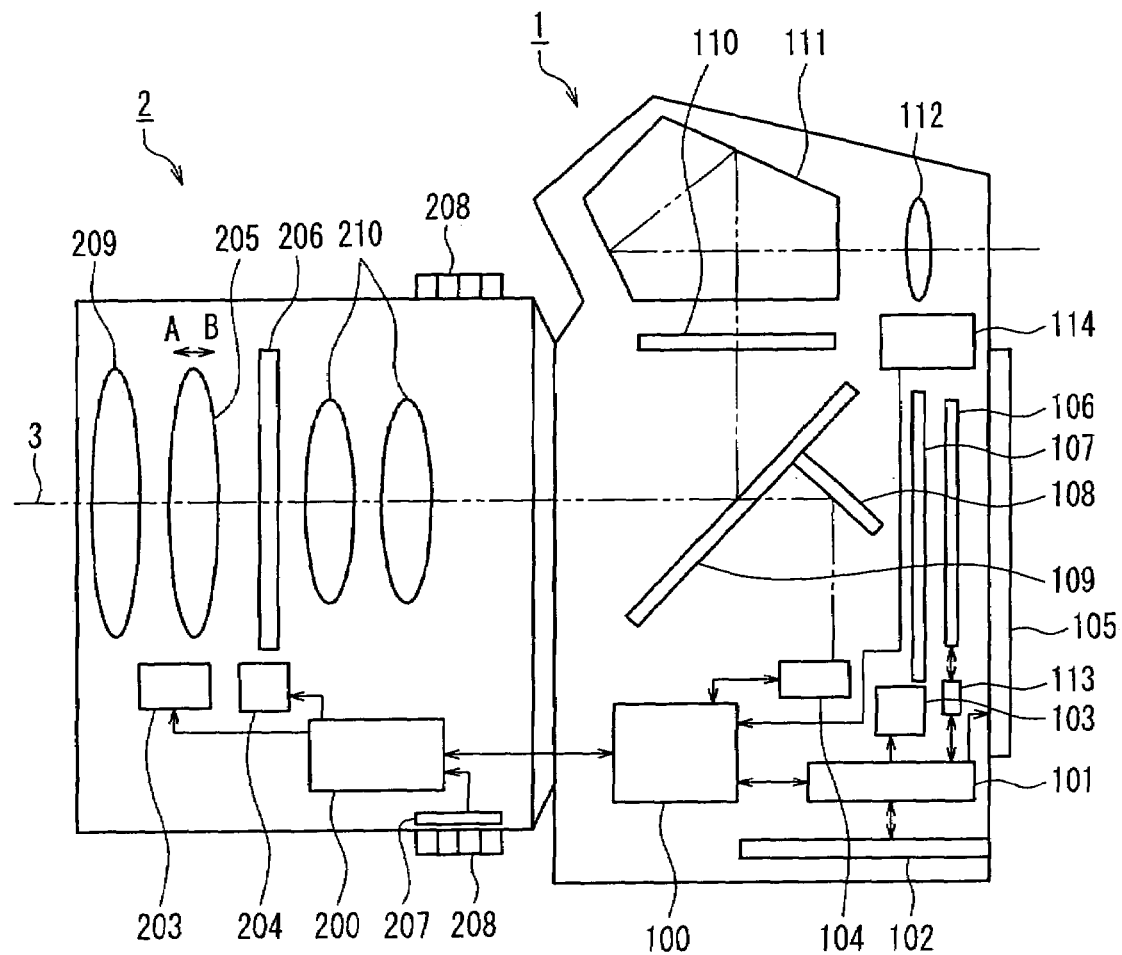
FIG. 1 is a schematic view showing an overall configuration of a single-lens reflex camera system.

FIG. 1 is a view showing a configuration of a single-lens reflex camera system according to Embodiment 1 of the present invention. The single-lens reflex camera system includes: a body unit 1 composed of a single-lens reflex camera body; and a lens unit 2 that is changeable with respect to the body unit 1. Herein, as the lens unit 1, a lens unit that is provided with at least a diaphragm portion 206, a diaphragm setting portion 207 and a diaphragm ring 208 (a first lens unit), and a lens unit that is provided with the diaphragm portion 206 but is not provided with any portion to adjust the diaphragm portion 206 (the diaphragm setting portion 207 or the diaphragm ring 208) (a second lens unit) may be used.

In FIG. 1, the body unit 1 is provided with: a sequence processor 100; a signal processor 101; a memory unit 102; a mechanism controller 103; a focus detector 104; a displaying portion 105; an image pickup device 106; a shutter 107; a sub-mirror 108; a main mirror 109; a focusing plate 110; a pentaprism 111; an ocular lens 112; and an image pickup device driver 113.

The sequence processor 100 controls an operation sequence in the body unit 1. Moreover, the focus detector 104 and a lens unit controller 200 in the lens unit 2 are connected to the sequence processor 100. Furthermore, an operation system is connected to the sequence processor 100, which is not illustrated in FIG. 1. Moreover, the sequence processor 100 can perform data communication with the lens unit controller 200 in the lens unit 2, thereby receiving information such as various kinds of lens data from the lens unit controller 200 and transmitting various kinds of commands to the lens unit controller 200. Furthermore, the sequence processor 100 is provided with a function of a detector that can detect whether a diaphragm adjusting member such as a diaphragm ring is mounted on the lens unit 2 or not, based on the lens data that is transmitted from the lens unit controller 200. In the present embodiment, the sequence processor 100 is composed of a microcomputer.

The memory unit 102, the mechanism controller 103, the displaying portion 105 and the image pickup device driver 113 are connected to the signal processor 101. The signal processor 101 performs signal processing with respect to an image that is picked up by the image pickup device 106 or a digital image that is read out from an information medium, and controls an operation of the mechanism controller 103. Moreover, the signal processor 101 can record the image that is picked up by the image pickup device 106 into the information medium via the memory unit 102. Furthermore, the signal processor 101 can allow the displaying portion 105 to display an image that is picked up, an image that is read out from the information medium and the like. In the present embodiment, the signal processor 101 is composed of a digital signal processing microcomputer.

The memory unit 102 records various kinds of information signals such as the image data that is output from the signal processor 101 into an information medium, and reads out various kinds of information signals such as image data that is recorded in the information medium. The information medium may be composed of a semiconductor memory or a hard disk drive that is included in the body unit 1, or may be composed of an attachable/detachable medium such as a semiconductor memory card or an optical disk. In the present embodiment, a semiconductor memory card that is attachable/detachable with respect to the body unit 1 is used.

The mechanism controller 103 controls the operations of the sub-mirror 108, the main mirror 109 and the shutter 107, by the control from the signal processor 101. In FIG. 1, control lines from the mechanism controller 103 to the sub-mirror 108 and the like are not illustrated.

The focus detector 104 detects a focus of an optical image that is incident via the lens unit 2.

The displaying portion 105 can display the photographed image or various kinds of information such as photographing date and time. The displaying portion 105 is composed of, for example, a liquid crystal display, but may be composed of another display such as an EL (electro-luminescent) device.

The image pickup device 106 picks up the incident optical image, converts the optical image into an electric signal, and then outputs the electric signal. The image pickup device 106 is composed of a CCD (charge coupled device) image sensor, a CMOS (complementary metal-oxide semiconductor) image sensor or the like.

The sub-mirror 108 is disposed at a stage subsequent to the main mirror 109 on an incident light axis 3, and reflects the incident optical image toward the focus detector 104 side.

The main mirror 109 is composed of a semitransparent mirror, and is disposed at a stage subsequent to the lens unit 2 on the incident light axis 3. Moreover, the main mirror 109 reflects the incident optical image toward the focusing plate 110 side, and at the same time, allows it to penetrate toward the sub-mirror 108 side.

The focusing plate 110 is disposed at a stage subsequent to the main mirror 109 on the incident light axis 3, and forms an optical image that is incident via the lens unit 2.

The pentaprism 111 is disposed at a stage subsequent to the focusing plate 110 on the incident light axis 3, and reflects, inside the pentaprism 111, the optical image that is formed on the focusing plate 110 so as to provide an upright image.

The image pickup device driver 113 controls driving of the image pickup device 106. For example, in the case where the image pickup device 106 is composed of a CCD image sensor, the image pickup device driver 113 controls exposure of the image pickup device 106 to light, vertical transmission, horizontal transmission and signal amplification, based on a predetermined clock.

The lens unit 2 is attachable/detachable with respect to the body unit 1. The lens unit 2 is provided with: a lens unit controller 200; a focus controller 203; a diaphragm controller 204; a focusing lens portion 205; a diaphragm portion 206; a diaphragm setting portion 207; a diaphragm ring 208; an objective lens 209; and a lens group 210.

The focus controller 203, the diaphragm controller 204, the diaphragm setting portion 207 and the sequence processor 100 in the body unit 1 are connected to the lens unit controller 200, and the lens unit controller 200 can control the respective portions. Moreover, the lens unit controller 200 can perform data communication with the sequence processor 100, thereby transmitting various kinds of information and the like on the lens unit 2 side to the body unit 1 and transmitting an operating command and the like from the body unit 1 to the lens unit 2. Furthermore, the lens unit controller 200 includes a memory in which various kinds of lens information are recorded. The various kinds of lens information includes a F number that represents brightness of the lens, a zoom ratio, a diaphragm value that can be set, and the like. In the present embodiment, the lens unit controller 200 is composed of a microcomputer.

The focus controller 203 controls movement of the focusing lens portion 205 in a direction of the optical axis (direction of an arrow A or an arrow B), based on a command from the lens unit controller 200. By moving the focusing lens portion 205 in the direction of the optical axis, focus can be achieved at a desired focusing position. In the focus controller 203, a motor and a driver for driving the motor are included, and the focusing lens portion 205 can be moved in the direction of the optical axis by them.

The diaphragm controller 204 controls the change in a diaphragm amount in the diaphragm portion 206, based on the command from the lens unit controller 200. In the diaphragm controller 204, a motor and a driver for driving the motor are included, and the diaphragm portion 206 can be driven by them.

The diaphragm portion 206 has a configuration where, for example, a plurality of blades are disposed on the optical axis so that they can be opened/closed freely, and increases/decreases a light amount to be incident into the camera system by opening/closing the plurality of the blades. The diaphragm portion 206 is opened/closed by the control from the diaphragm controller 204, thereby increasing/decreasing the light amount to be passed through.

The diaphragm setting portion 207 detects a setting state of the diaphragm ring 208, and transmits a set diaphragm value to the lens unit controller 200.

Figure 9A:
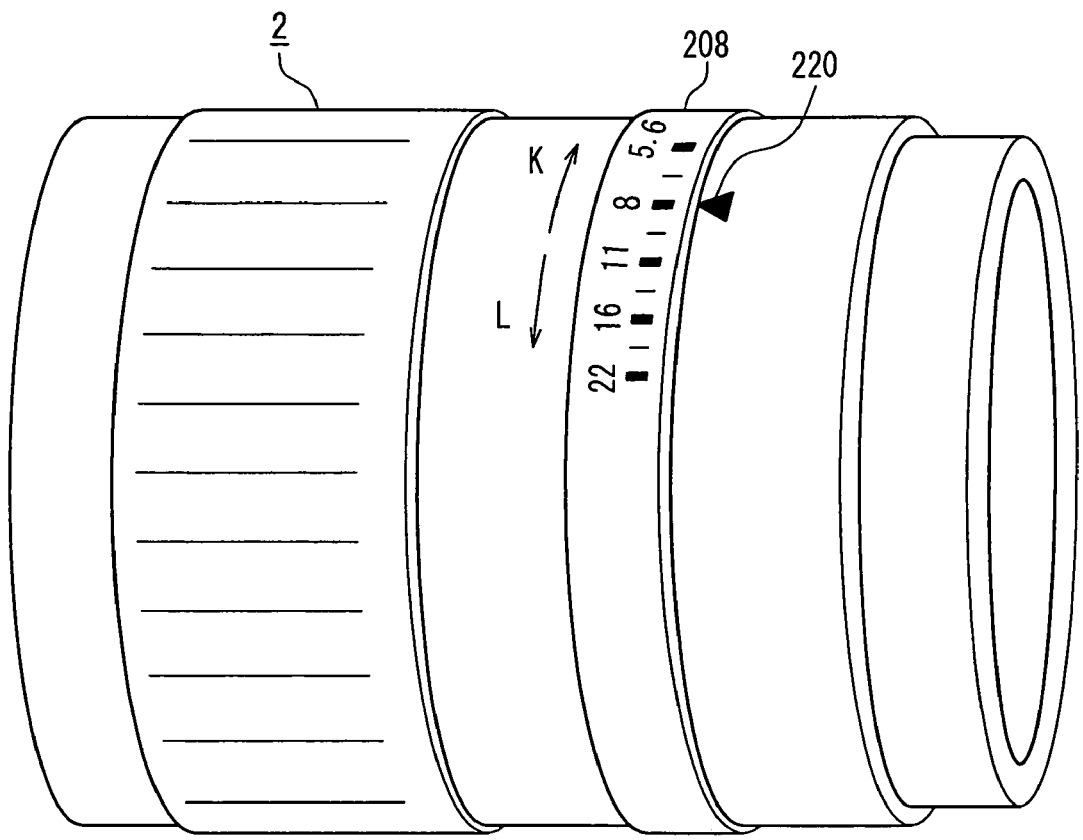
FIG. 9A is a perspective view showing an appearance of a lens unit that is provided with a diaphragm ring.
Figure 9B:
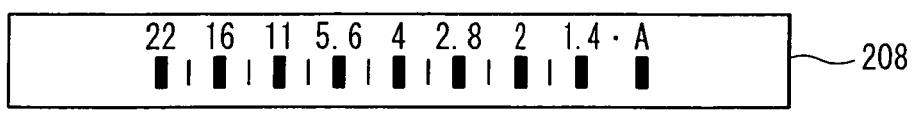
FIG. 9B is a schematic view showing diaphragm values printed on the diaphragm ring.

The diaphragm ring 208 allows the photographer to set the diaphragm value. The diaphragm ring 208 is disposed rotatably on a peripheral surface of the lens unit 2, as shown in FIG. 9A, for example. FIG. 9A is a perspective view showing an appearance of the lens unit having no diaphragm ring 208. Moreover, FIG. 9B is a schematic view showing diaphragm values that are printed on the diaphragm ring 208. As shown in FIG. 9A, on a cylindrical surface of the lens unit 2, the diaphragm ring 208 that can be rotated in a direction of an arrow K or an arrow L is disposed. The diaphragm ring 208 is configured so that the diaphragm value can be set in a range from a minimum diaphragm value of F22 to an open diaphragm value of F1.4. Moreover, a position "A" that represents an automatic mode, in which the diaphragm value can be set automatically in the camera, is set as well. According to the configuration shown in FIG. 9A, the diaphragm value can be decreased by rotating the diaphragm ring 208 in the direction of the arrow K, and can be increased by rotating the diaphragm ring 208 in the direction of the arrow L.

In FIG. 1, the optical image that is incident from the subject side along the optical axis 3 passes through the objective lens 209, the focusing lens portion 205 and the lens group 210 in the lens unit 2, and is reflected upward by the main mirror 109, and then, an image is formed on the focusing plate 110. The thus formed optical image is reflected by the inside of the pentaprism 111, whereby an upright image can be obtained. The photographer can visually recognize the upright image through the ocular lens 112.

Moreover, a part of the optical image that is incident from the subject side penetrates the main mirror 109, and is reflected downward by the sub-mirror 108 so as to be introduced into the focus detector 104. The focus detector 104 can detect a focus of the optical image by, for example, a phase-contrast detecting method.

FIG. 1 shows a case where the lens unit provided with the diaphragm setting portion 207 and the diaphragm ring 208 is attached to the body unit 1, but the configuration of the single-lens reflex camera system of the present invention is not limited to this. A lens unit having no diaphragm setting portion 207 or the diaphragm ring 208 also can be attached to the body unit 1.

Figure 2:
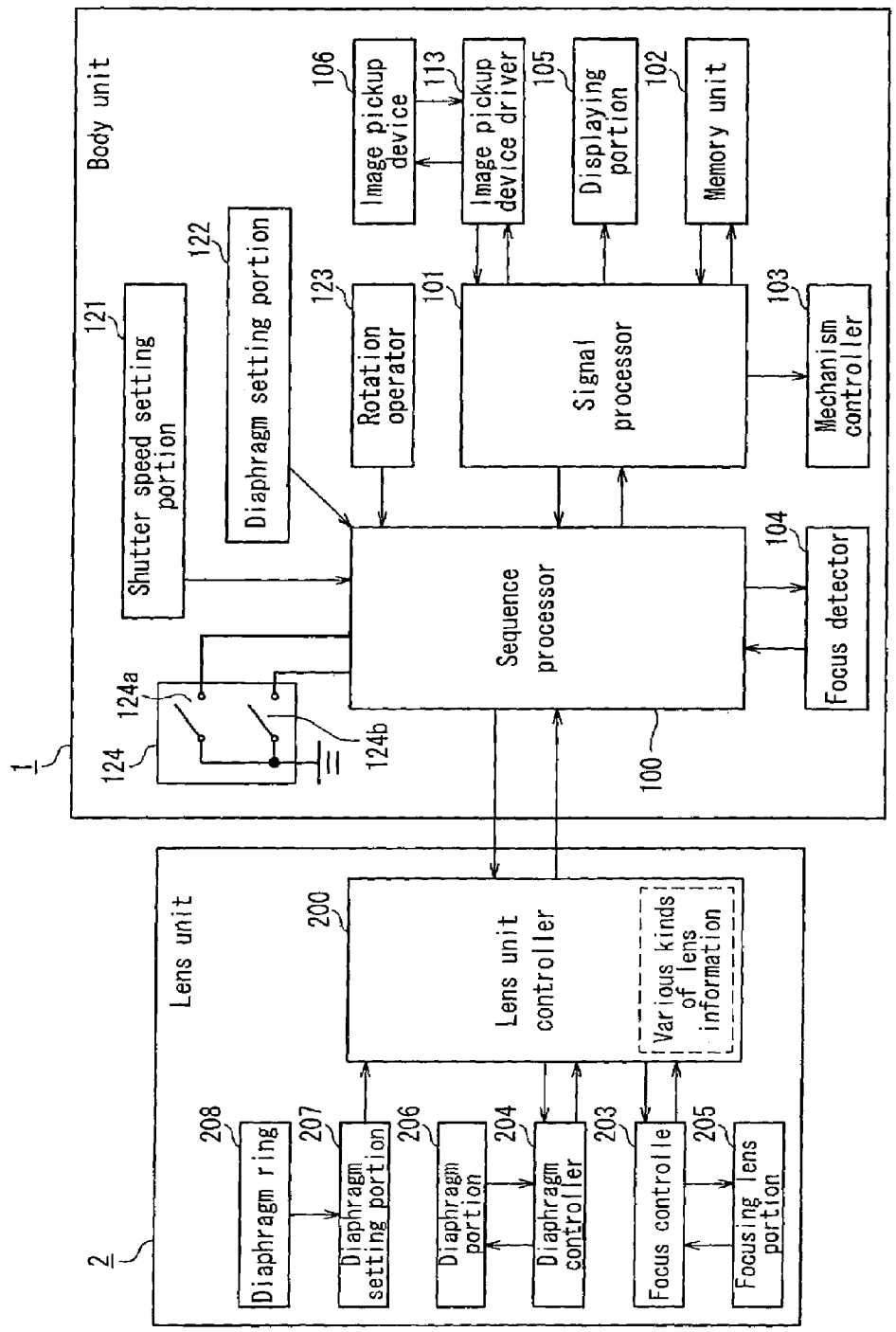
FIG. 2 is a block diagram showing a configuration of the single-lens reflex camera system.
Figure 4A:
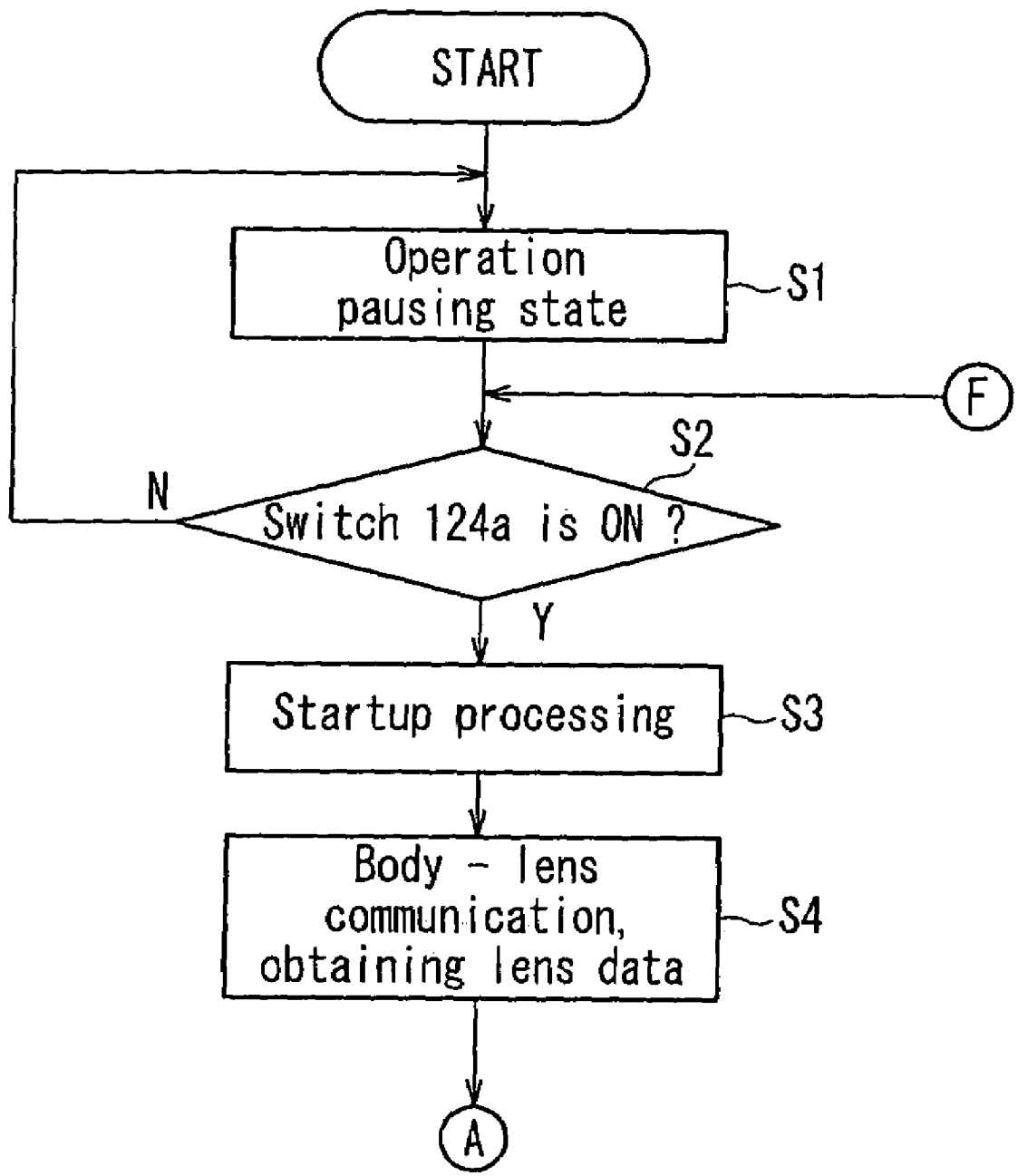
FIG. 4A is a flow chart showing a sequence of photographing by the single-lens reflex camera system.
Figure 4B:
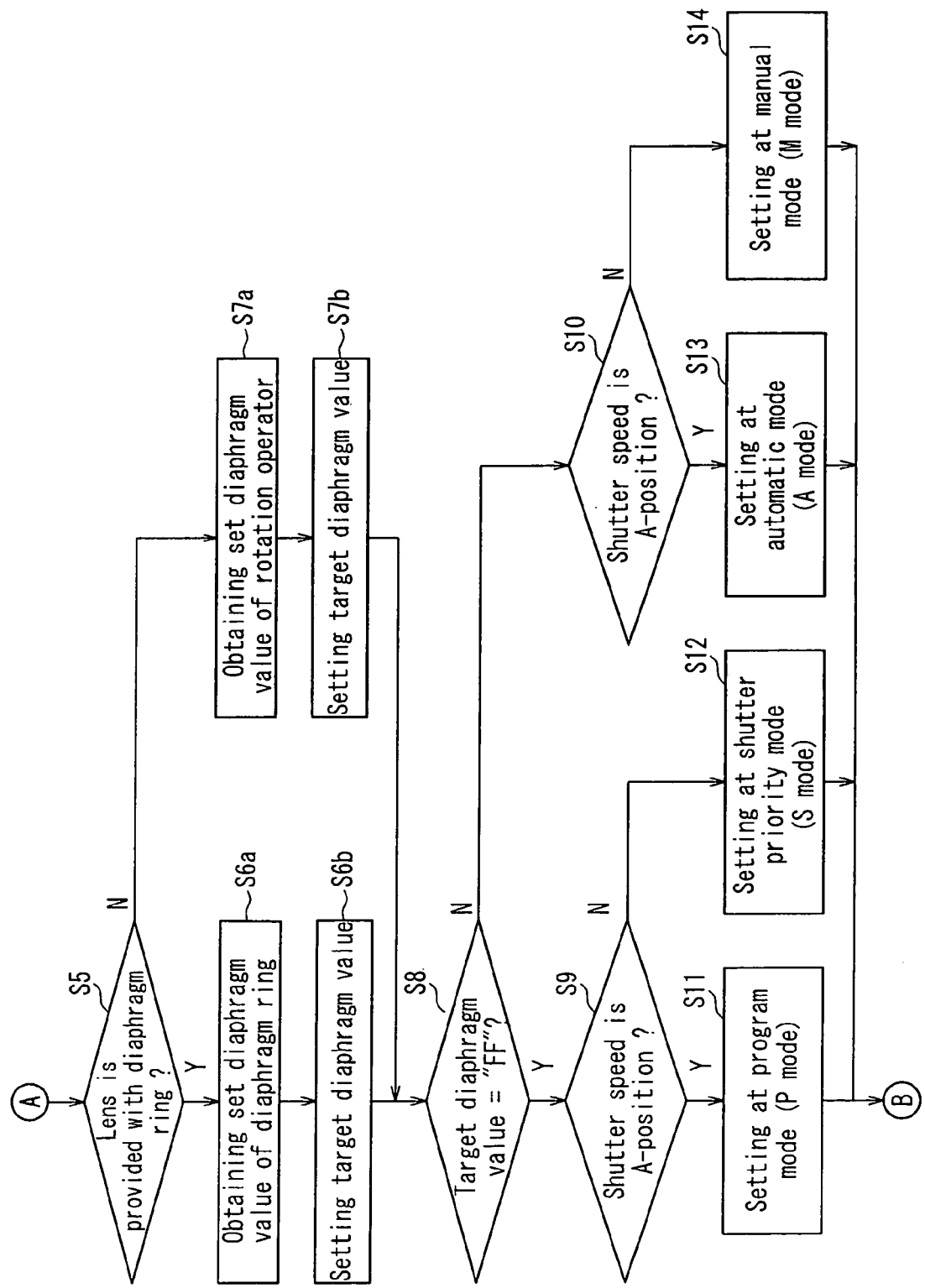
FIG. 4B is a flow chart showing the sequence of photographing by the single-lens reflex camera system.
Figure 4C:
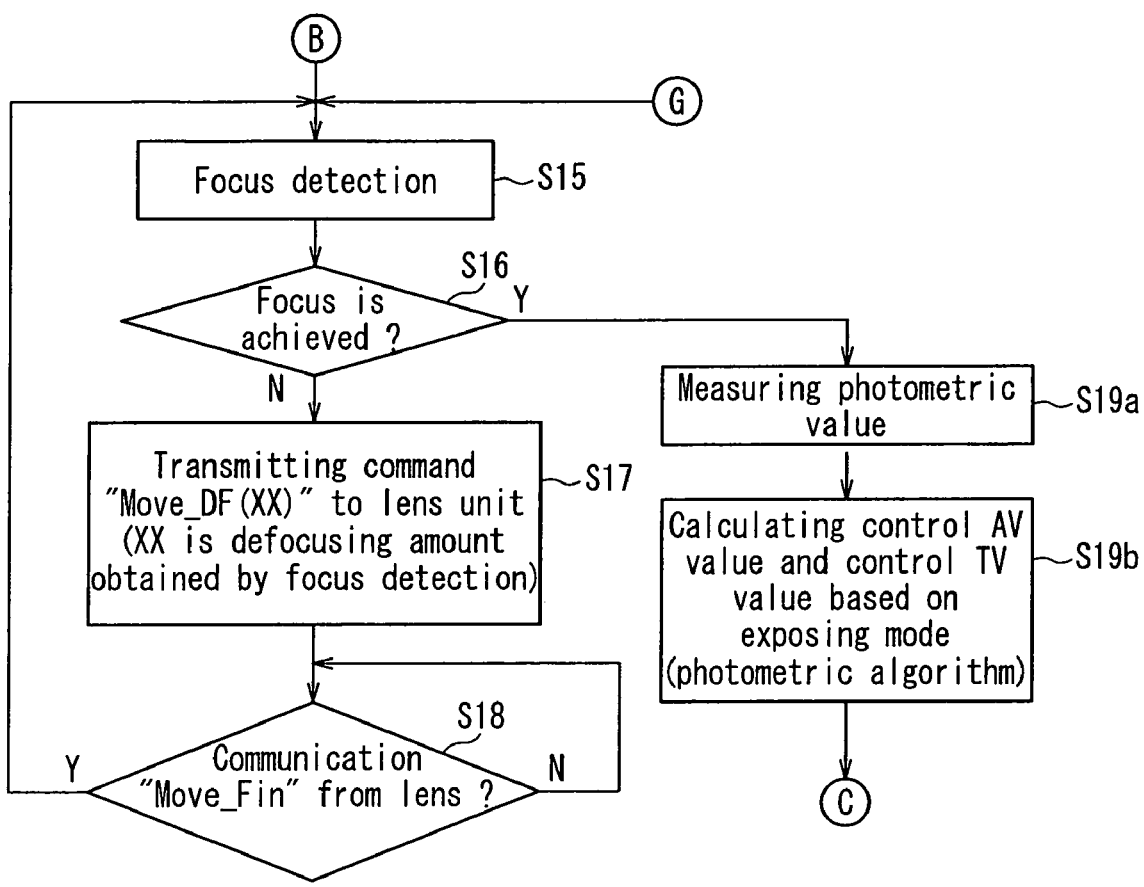
FIG. 4C is a flow chart showing the sequence of photographing by the single-lens reflex camera system.
Figure 4D:
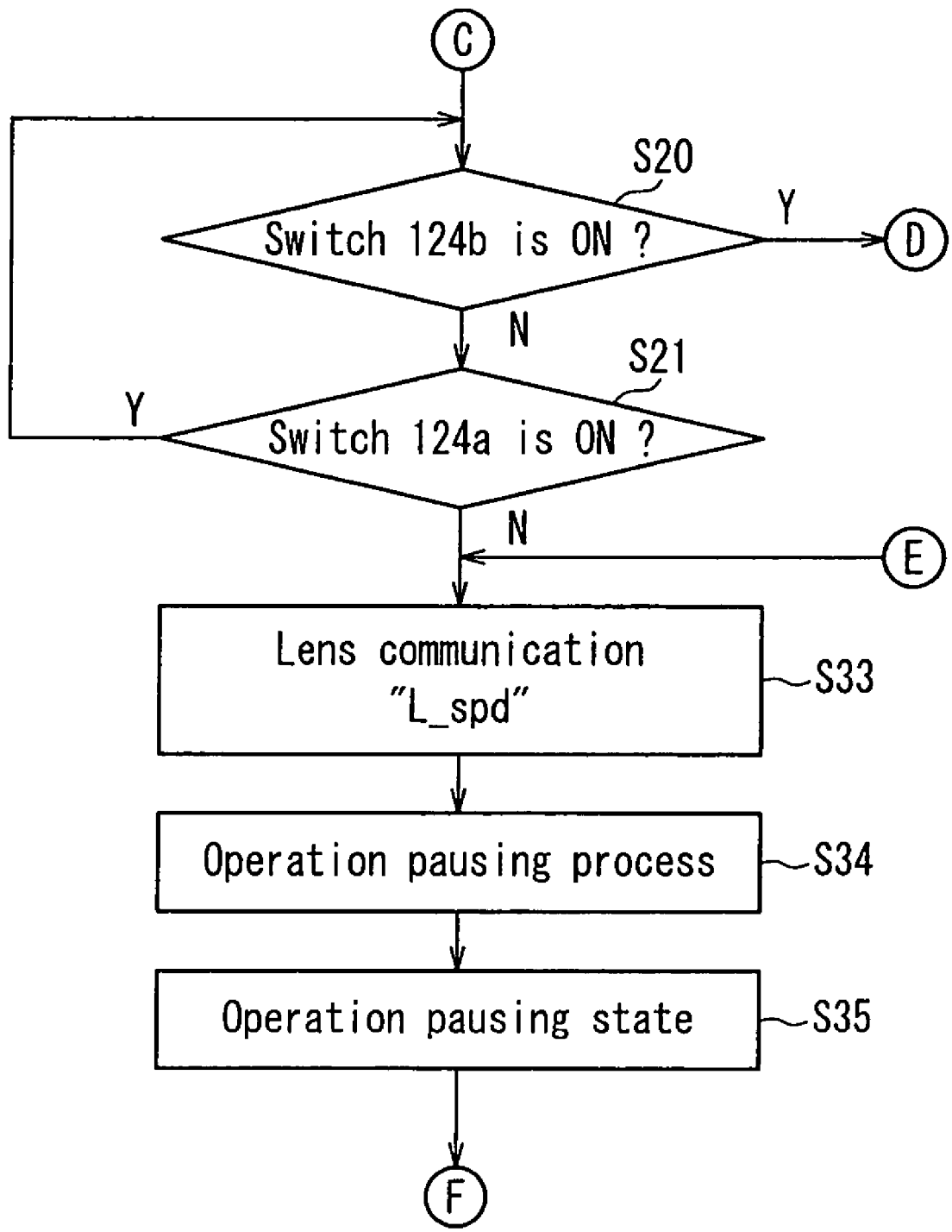
FIG. 4D is a flow chart showing the sequence of photographing by the single-lens reflex camera system.
Figure 4E:
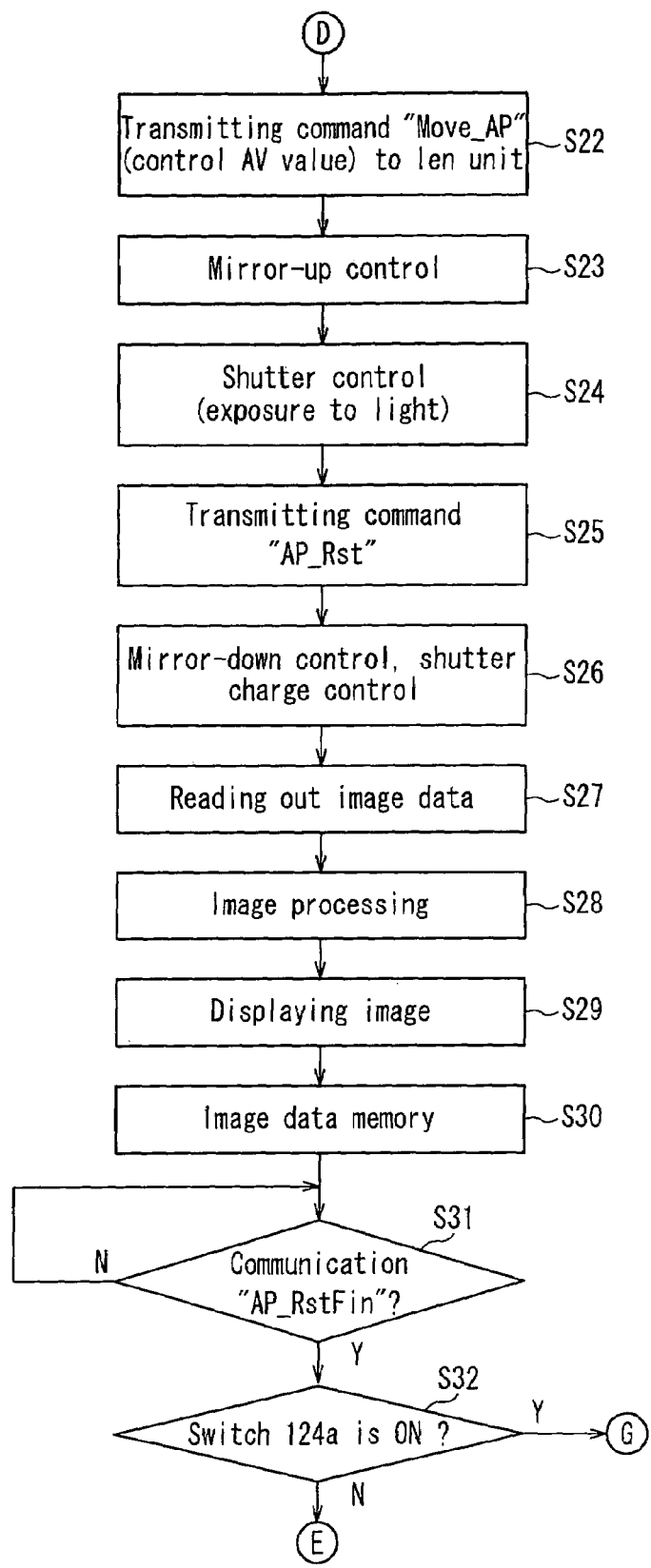
FIG. 4E is a flow chart showing the sequence of photographing by the single-lens reflex camera system.

FIG. 2 is a block diagram showing a configuration of a controlling system in the single-lens reflex camera system according to Embodiment 1. In FIG. 2, the detailed explanation of the components that were described with reference to FIG. 1 will be omitted.

In FIG. 2, the body unit 1 is provided with: a release switch 124 including switches 124a and 124b; a shutter speed setting portion 121; a diaphragm setting portion 122; and a rotation operator 123, in addition to the components shown in FIG. 1.

The release switch 124 is composed of a push button, by which a half push and a full push can be performed. The half push means an operation for pushing the push button in a stroke direction only by a small distance (for example, about a half of the entire stroke distance of the push button). The full push means an operation for pushing the push button by the entire stroke distance. In the release switch 124, the switch 124a is turned on when performing the half push, and the switch 124b is turned on when performing the full push.

Figure 8:
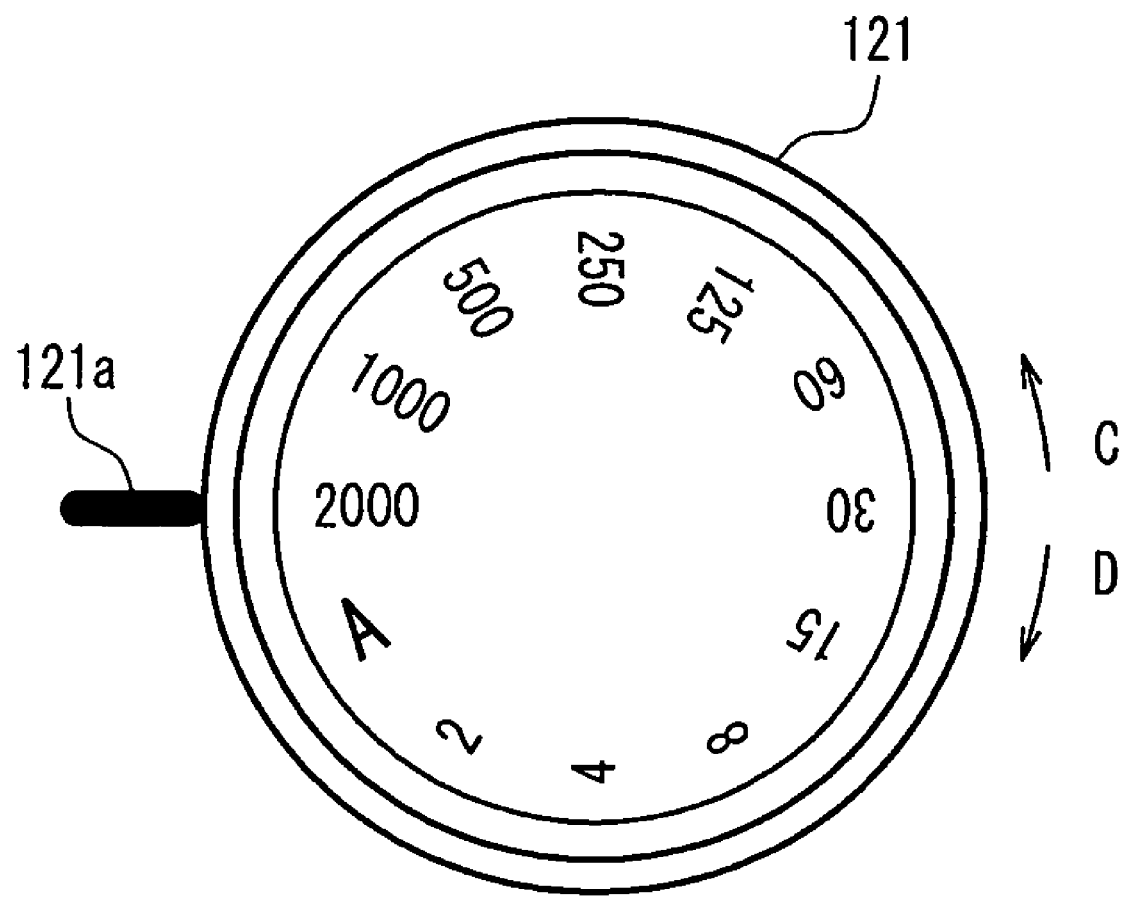
FIG. 8 is a plan view showing an appearance of a shutter speed setting portion.

The shutter speed setting portion 121 enables a shutter speed to be set at the time of photographing, and is configured as shown in FIG. 8, for example. The shutter speed setting portion 121 shown in FIG. 8 generally is disposed on an upper surface of the body unit 1 or on a surface thereof on which the displaying portion 105 is disposed, and can be rotated in a direction of an arrow C or an arrow D. Moreover, numeric values such as "2" or "2000" or a letter of "A" are printed on, for example, an upper surface of the shutter speed setting portion 121. The numeric values of 2 to 2000 illustrated in FIG. 8 denote values of the shutter speed that are preset in the body unit 1. For example, "2" denotes the shutter speed of ½ seconds, and "2000" denotes the shutter speed of ½000 seconds. Moreover, "A" denotes a mode in which the camera system automatically sets the shutter speed based on an ambient light amount, the diaphragm value and/or the like. By setting "A" at a mark 121a, the camera system automatically can set the shutter speed to be most appropriate, depending on a light amount in a photographing environment and a zoom ratio. The photographer operates the shutter speed setting portion 121 so as to set the numeric value corresponding to the desired shutter speed at the mark 121a that is printed on the upper surface of the body unit 1, thereby setting at the desired shutter speed.

Figure 5:
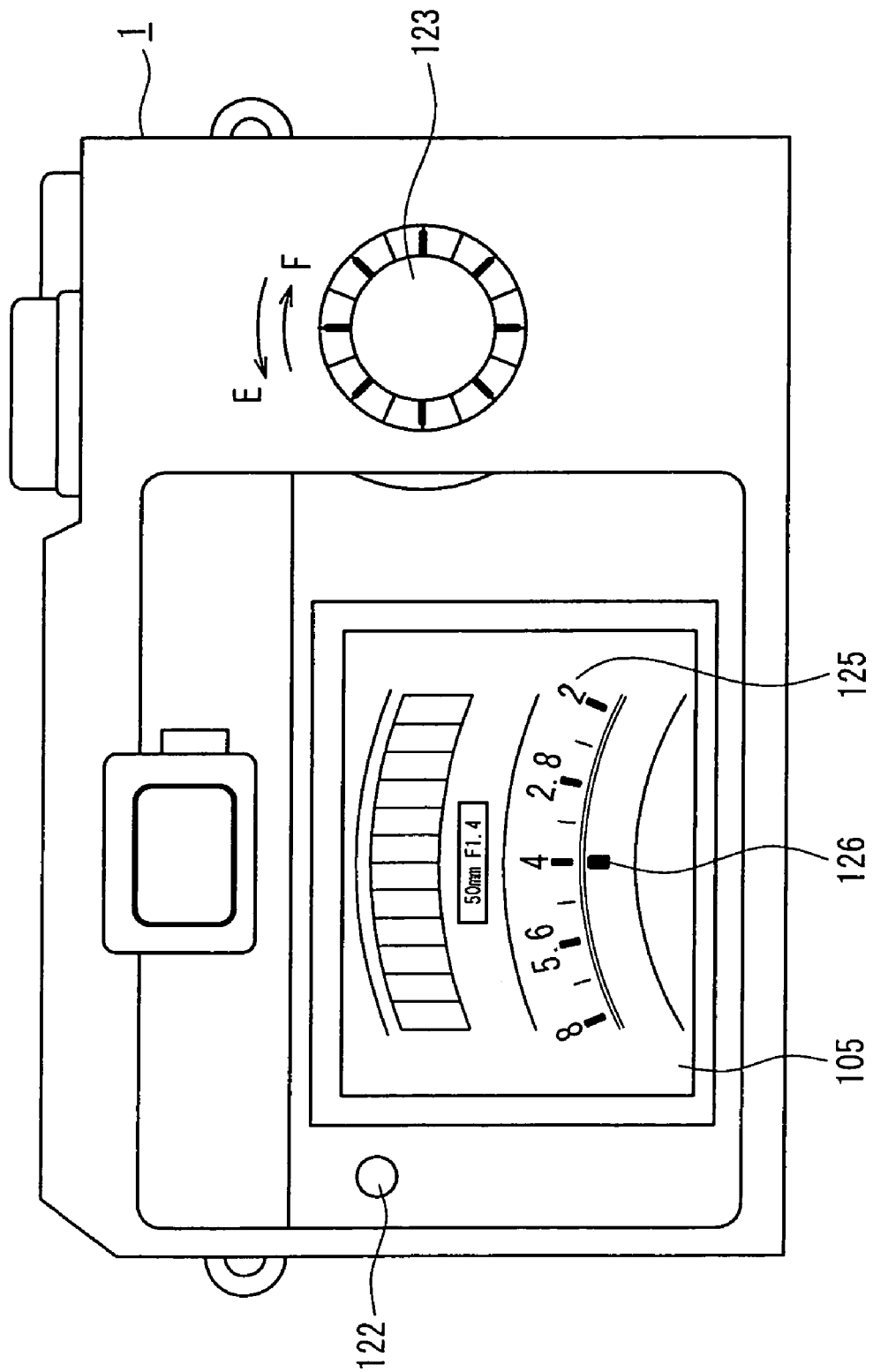
FIG. 5 is a side view showing a face where a displaying portion is disposed in the single-lens reflex camera system.

The diaphragm setting portion 122 can transfer the camera system into a mode that is capable of setting the diaphragm value in the body unit 1 by being operated by the photographer, which corresponds to the diaphragm setting portion 122 in FIG. 5.

The rotation operator 123 enables to set the diaphragm value by being rotated. More specifically, the rotation operator 123 is configured so that the diaphragm value can be set by operating the rotation operator 123 while operating the diaphragm setting portion 122.

Hereinafter, in the description below, the diaphragm value that can be set by the diaphragm ring 208 or the rotation operator 123 is represented as a "set diaphragm value".

The operations will be described below.

In FIGS. 1 and 2, by half-pushing the release button 124, the switch 124a is turned on, and an electric power of a power supply is supplied from a battery and a power supply circuit (not illustrated) into each microcomputer and each portion. Next, the sequence processor 100 in the body unit 1 receives various kinds of lens data from the lens unit controller 200 in the lens unit 2 via an electric contact (not illustrated) of a mount that connects the body unit 1 to the lens unit 2. The received various kinds of lens data is stored in a memory that is included in the sequence processor 100. In this lens data, information related to the presence/absence of the diaphragm value setting portion such as the diaphragm ring 208, information on the set diaphragm value that can be set by the diaphragm ring 208, information on a zoom ratio or a F number of the lens and the like are included.

Next, the sequence processor 100 obtains a difference from the focus (hereinafter, called a Df amount) from the focus detector 104. Thereafter, the sequence processor 100 instructs the lens unit controller 200 to drive the focusing lens portion 205 by the obtained Df amount.

The lens unit controller 200 controls the focus controller 203 based on the instruction from the sequence processor 100, and operates the focusing lens portion 205 by the Df amount. Thereby, by repeating the focus detection and the driving of the focusing lens portion 205, the Df amount is decreased gradually. When the Df amount becomes a predetermined value or smaller, the lens unit controller 200 judges that the focus is achieved, and then stops the operation of the focusing lens portion 205.

Thereafter, the sequence processor 100 waits until the release button 124 is full-pushed so as to turn on the switch 124b. When the switch 124b is turned on, the sequence processor 100 instructs the lens unit controller 200 to provide a predetermined diaphragm value. This diaphragm value is calculated based on light amount information that is measured by a photometric sensor (not illustrated), and information on a set diaphragm value that is set at the diaphragm value setting portion (or the diaphragm value that is set at the diaphragm value setting portion in the body unit 1, in the case where the diaphragm value setting portion such as the diaphragm ring is not mounted on the lens unit 2). Hereinafter, the calculated diaphragm value will be called a "target diaphragm value".

The lens unit controller 200 controls the diaphragm driver 204 based on the instruction from the sequence processor 100, and restricts the diaphragm value in the diaphragm portion 206 to become the target diaphragm value.

The sequence microcomputer 101 instructs the signal processor 101 on the operation of the release sequence, at the same time when instructing the lens unit controller 200 to perform the diaphragm control.

The signal processor 101 firstly instructs the mechanism controller 103 to displace the mirrors. The mechanism controller 103 displaces the sub-mirror 108 and the main mirror 109 outside the optical path, based on the instruction from the signal processor 101.

After completing the displacement of the sub-mirror 108 and the main mirror 109, the signal processor 101 instructs the image pickup device driver 113 to drive the image pickup device 106, and instructs the mechanism controller 103 to operate the shutter 107. The mechanism controller 103 opens the shutter 107 during a time corresponding to a shutter speed that is calculated based on the light amount information measured by the photometric sensor and the target diaphragm value, thereby exposing the image pickup device 106 to light.

After the completion of the exposure of the image pickup device 106 to light, the signal processor 101 controls the image pickup device driver 113, and reads out pickup data from the image pickup device 106. The read-out pickup data is converted into digital image data in the signal processor 101. The digital image data is output to the displaying portion 105, and the displaying portion 105 can display the image. Moreover, the image data generated in the signal processor 101 is subjected to image compression and the like, and subsequently can be written into an information medium in the memory unit 102.

Moreover, after completing the exposure of the image pickup device 106 to light, the sequence processor 100 instructs the mechanism controller 103 to place the sub-mirror 108, the main mirror 109 and the shutter 107 at their initial positions, at the same time. The mechanism controller 103 transmits exposure completion information to the sequence processor 100, after the placement of the sub-mirror 108, the main mirror 109 and their shutter 107 at the initial positions based on the instruction from the sequence processor 100.

Furthermore, the sequence processor 100 instructs the lens unit controller 200 to set the diaphragm portion 206 at an opening position. The lens unit controller 200 controls the diaphragm controller 204 and sets the diaphragm portion 206 at the opening position (resetting process), based on the instruction from the sequence processor 100. After the resetting process, the lens unit controller 200 transmits reset completion information to the sequence processor 100.

The sequence processor 100 receives the reset completion information from the lens unit controller 200 and completion information on a series of processes after the exposure to light in the signal processor 101, and subsequently completes a photographing sequence when the release button 124 is not pushed (both of the switches 124a and 124b are off).

[Communication Operation]

Next, a communication operation between the body unit 1 and the lens unit 2 will be described.

FIG. 3 is a timing chart showing the communication operation between the body unit 1 and the lens unit 2. FIG. 3(*a*) shows an operation of the switch 124*a*, FIG. 3(*b*) shows an operation of the switch 124*b*, FIG. 3(*c*) shows an operation of the body unit 1, and FIG. 3(*d*) shows an operation of the lens unit 2. FIG. 3 shows the communication operation in the case where the lens unit having no diaphragm value setting portion is attached to the body unit 1. Furthermore, in FIG. 3(*c*), processes at respective timings are represented by codes A1 to A15, and specific contents to be processed are shown in FIG. 3(*e*). Moreover, in FIG. 3(*d*), processes at respective timings are represented by codes B1 to B8, and specific contents to be processed are shown in FIG. 3(*e*).

In FIG. 3, while the body unit 1 and the lens unit 2 are in operation pausing states (A1, B1), when the release button 124 is half-pushed so as to turn on the switch 124*a*, the body unit 1 and the lens unit 2 are subjected to startup processes (A2, B2). During the startup processes, the lens unit 2 transmits various kinds of lens information to the body unit 1. Herein, the lens information transmitted from the lens unit 2 includes: information AV_Ring on the presence/absence of the diaphragm setting portion 207 and the diaphragm ring 208 mounted on the lens unit 2; diaphragm value information Open AV at the time of opening; minimum diaphragm value information Min_AV; and setting information AV_Ring_Value of the diaphragm value setting portion that is mounted on the lens unit 2.

Next, the body unit 1 detects a focus in order to perform the focusing operation (A3). Based on the Df amount that is calculated by the focus detecting operation, the body unit 1 transmits a command Move_DFxx to the lens unit 2 to operate the focusing lens portion 205. Herein, "xx" denotes a variable representing the Df amount.

The lens unit 2 receives the command Move_DFxx, and drives the focusing lens portion 205 by the Df amount (B4). Herein, the body unit 1 waits until the driving of the focusing lens portion 205 stops (A5). After the completion of the driving of the focusing lens portion 205, the lens unit 2 transmits operation completion information Move_Fin to the body unit 1.

The body unit 1 detects the focus again after receiving the completion information Move_Fin, and calculates the Df amount (A6). Herein, since the first focus detecting operation was already performed at the timing A4, there is exceedingly high possibility that the Df amount obtained at the timing A6 is extremely small. Therefore, it is judged that the focusing lens portion 205 is in the focusing state, at the time of the completion of the focus detecting operation that is performed at the timing A6.

Next, the body unit 1 waits until the release button 124 is full-pushed so as to turn on the switch 124*b* (A7). When the switch 124*b* is turned on, the body unit 1 transmits a diaphragm driving command Move_Ap (a command to drive the diaphragm portion 206 so that the present diaphragm value coincides with the target diaphragm value) to the lens unit 2. Thereafter, the body unit 1 performs a mirror-up process (A8). After receiving the command Move_Ap, the lens unit 2 controls the diaphragm portion 206 so that the present diaphragm value therein coincides with the target diaphragm value (B5). Herein, the diaphragm portion 206 is configured so that the driving thereof may be completed in a shorter period of time than the mirror-up time of the body unit 1.

Next, the body unit 1 performs an exposing operation after the completion of the mirror-up operation (A9). Specifically, the body unit 1 opens/closes the shutter 107 during the time corresponding to the shutter speed so as to expose the image pickup device 106 to light.

After the completion of the exposure of the image pickup device 106 to light, the body unit 1 transmits, to the lens unit 2, a resetting command AP_Rst to allow the diaphragm portion 206 to be in an open state. The lens unit 2 receives the resetting command AP_Rst, and allows the diaphragm portion 206 to be in the open state (B6). After transferring the diaphragm portion 206 into the open state, the lens unit 2 transmits reset completion information AP_RstFin to the body unit 1.

Moreover, after the completion of the exposure of the image pickup device 106 to light shown as the timing A9, the body unit 1 performs a mirror-down control and a shutter charge control to move the shutter 107 to the initial position (A13). Furthermore, the body unit 1 reads out the image data from the image pickup device 106 at the same time of the process A13 (A10), performs image processing with respect to the read-out image data (A11), and controls the displaying portion 105 to display the photographed image (A12). Furthermore, the image data is stored in the information medium via the memory unit 102 (A12).

Next, after the completion of a series of the processes in the body unit 1 and the resetting process of the diaphragm portion 206 in the lens unit 2, if the switches 124*a* and 124*b* are off, the body unit 1 transmits an operation pausing command L_spd to the lens unit 2. When the operation pausing command L_spd is input, the lens unit 2 performs an operation pausing process (B7) so as to be transferred into an operation pausing state (B8). Moreover, the body unit 1 also performs the operation pausing process (A14) so as to be transferred into the operation pausing state (A15). Herein, the "operation pausing state" denotes a state where the feeding of the electricity to almost all of the circuits and the like that are included in the body unit 1 and the lens unit 2 is stopped, the operations thereof are stopped, and the electricity is fed only to the minimum number of circuits required to be operated, at least when transferring from the operation pausing state to an operating state (recovering process).

In the operation pausing state, when the release switch 124 is operated so as to turn on the switch 124*a* or 124*b*, a series of the sequence processes are performed again from the processes A2 and B2.

Tables 1 and 2 are lists showing data, commands and communication contents that are communicated between the body unit 1 and the lens unit 2.

TABLE 1

Data between body unit and lens unit

| Data name | Communicating direction | Content |
| --- | --- | --- |
| AV_Ring | Lens >> Body | Information on presence/absence of diaphragm ring (0 = absent, 1 = present) |
| Open_AV | Lens >> Body | Information on open diaphragm value |
| Min_AV | Lens >> Body | Information on minimum diaphragm value |
| AV_Ring_Value | Lens >> Body | Information on set value of diaphragm ring |

TABLE 2

Command and communication between body unit and lens unit

| Data name | Communicating direction | Content |
|---|---|---|
| Move_DF(xx) | Body >> Lens | Command to drive focusing lens by defocusing amount of xx (mm) |
| Move_Fin | Lens >> Body | Communication showing that driving of focusing lens is completed by instructed defocusing amount |
| Move_AP(AV) | Body >> Lens | Command to drive diaphragm so that diaphragm value is AV |
| AP_Rst | Body >> Lens | Command to drive diaphragm portion to be at opening position |
| AP_ResFin | Lens >> Body | Communication to show that driving of diaphragm portion is completed at opening position |
| L_spd | Body >> Lens | Command to transfer lens unit into operation pausing mode |

Next, a flow of the communication operations between the body unit 1 and the lens unit 2 will be described in further detail.

FIGS. 4A to 4E are flow charts showing a flow of the communication between the body unit 1 and the lens unit 2.

Firstly, while the single-lens reflex camera system is in the operation pausing state (Step S1), the sequence processor 100 waits until the release button 124 is half-pushed so as to turn on the switch 124a (Step S2). When the switch 124a is turned on, electricity is supplied to each of the circuits and the like in the system. Next, the sequence processor 100 so as to perform a startup operation (Step S3).

Next, the body unit 1 communicates with the lens unit 2, and lens information that is stored in the lens unit controller 200 is transmitted to the sequence processor 100 (Step S4).

The sequence processor 100 analyzes the received lens information, and judges the presence or absence of the diaphragm setting portion 207 and the diaphragm ring 208 mounted on the lens unit 2 (Step S5).

In the case where the diaphragm setting portion 207 and the diaphragm ring 208 are mounted on the lens unit 2, the lens unit controller 200 obtains a set diaphragm value from the diaphragm setting portion 207 (Step S6a). Next, the lens unit controller 200 sends the set diaphragm value to the sequence processor 100. Next, the sequence processor 100 sets the target diaphragm value to the set diaphragm value that is selected at the diaphragm ring 208. Moreover, when an A-position is selected at the diaphragm ring 208, the sequence processor 100 sets the target diaphragm value at a value "FF" (Step S6b).

Whereas, when the diaphragm setting portion 207 and the diaphragm ring 208 are not mounted on the lens unit 2, the sequence processor 100 obtains the set diaphragm value that is set at the rotation operator 123 (Step S7a). Next, the sequence processor 100 sets the target diaphragm value at the set diaphragm value that is set at the rotation operator 123. Moreover, when the diaphragm setting in the body unit 1 is at the A-position, the sequence processor 100 sets the target diaphragm value at the value "FF" (Step S7b).

Next, the sequence processor 100 judges whether the target diaphragm value is the value "FF" or not (Step S8).

In the case where the target diaphragm value is not the value "FF" (that is, the case where the diaphragm value is set at a numeric value), the sequence processor 100 judges whether the shutter speed setting portion 121 is set at the A-position or not (Step S10).

In the case where the shutter speed setting portion 121 is set at the A-position, the sequence processor 100 transfers the camera system to be in a diaphragm priority mode (A mode), and sets a control TV value at the value "FF" (Step S13). The control TV value denotes a shutter speed at the time when actually performing a shutter operation, and can be set by a shutter setting portion 121 shown in FIG. 8. Herein, the value "FF" denotes a shutter speed that is set automatically by the camera system.

Whereas, when the shutter speed setting portion 121 is not at the A-position, the sequence processor 100 transfers the camera system to be in a manual mode (M mode), and sets the control TV value at the value of the shutter speed that is set at the shutter speed setting portion 121 (Step S14).

Moreover, in Step S8, in the case where the target diaphragm value is "FF", the sequence processor 100 judges whether the shutter speed setting portion 121 is set at the A-position or not (Step S9).

In the case where the shutter speed setting portion 121 is set at the A-position, the sequence processor 100 transfers the camera system to be in a program mode (P mode), and sets the target diaphragm value at the value "FF". Moreover, the sequence processor 100 sets the control TV value at the value "FF".

Whereas, in the case where the shutter speed setting portion is not set at the A-position, the sequence processor 100 transfers the camera system to be in a shutter speed priority mode (S mode), and sets the target diaphragm value at the value "FF". In addition to this, the sequence processor 100 sets the control TV value at the value of the shutter speed that is set at the shutter speed setting portion 121.

As mentioned above, by setting the diaphragm and the shutter speed, any one of the P mode, the S mode, the A mode and the M mode is set. Next, the body unit 1 detects a focus by controlling the focus detector 104 (Step S15).

The sequence processor 100 judges whether the detected Df amount is in a focusing range or not (Step S16). When the Df amount is out of the focusing range, the sequence processor 100 transmits a command Move_DFXX to the lens unit controller 200 so as to drive the focusing lens portion 205 by the Df amount (Step S17).

Next, the sequence processor 100 waits for the driving completion information Move_Fin of the focusing lens from the lens unit 2, and, when the lens unit 2 transmits the driving completion information Move_Fin, the process is returned to Step 15, thereby repeating the focus detecting operation (Step S18).

When the Df amount is decreased to be extremely small over the course of time and comes into the focusing range (Result Y in Step S16), the sequence processor 100 terminates the focus detecting operation in the focus detector 104, and detects brightness (photometric value) of the subject to be photographed (Step S19a). The sequence processor 100 determines the target diaphragm value and the control TV value, depending on the detected photometric value and the exposing mode (any of the P mode, the S mode, the A mode and the M mode) (Step S19b).

Next, the sequence processor 100 detects whether the switch 124b is on or not (Step S20), and if the switch 124b is still off, the sequence processor 100 subsequently detects whether the switch 124a is off or not (Step S21). If the switch 124a is off, it is considered that the photographer stopped pushing the release button 124 so as to discontinue the photographing operation. At this time, the sequence processor 100 transmits the operation pausing command L_spd to the lens unit 2 (Step S33). Thereby, the lens unit 2 performs the operation pausing process, and subsequently comes into the operation pausing state. Moreover, the body unit 1 also performs the operation pausing process (Step S34), and comes into the operation pausing state (Step S35). Thereafter, the sequence processor 100 returns to Step S2, and waits until the switch 124a is turned on again.

Moreover, in Step S20, when being operated so as to turn on the switch 124b, the sequence processor 100 transmits a command Move_APAV to the lens unit 2, and controls the diaphragm portion 206 so that the diaphragm amount thereof is the target diaphragm value (Step S22).

The sequence processor 100 performs the mirror-up control (Step S23) after transmitting the command to the lens unit 2. After the completion of the mirror-up control, the sequence processor 100 achieves a shutter control, and performs the exposing operation (Step S24). Subsequently, the sequence processor 100 transmits, to the lens unit 2, a command AP_Rst to allow the diaphragm portion 206 to perform resetting driving to be at the opening position (Step S25). Next, the mechanism controller 103 performs the mirror-down control and a control to place the shutter at the initial position (reset shutter charge) (Step S26). The signal processor 101 reads out the image data from the image pickup device 106 (Step S27). Subsequently, the image data that is read out from the image pickup device 106 is subjected to image processing at the signal processor 101 (Step S28). Thereafter, the signal processor 101 allows the displaying portion 105 to display the image data that has been subjected to the image processing (Step S29). Next, the signal processor 101 records the image data into the information medium via the memory unit 102 (Step S30).

Moreover, after transmitting the command AP_Rst to the lens unit 2, the sequence processor 100 waits until the lens unit 2 transmits the information AP_RstFin on the completion of the resetting operation (Step S31).

When receiving the information AP_RstFin, the sequence processor 100 subsequently judges whether the release button 124 is half-pushed so as to turn on the switch 124a or not (Step S32).

When the switch 124a is turned on, the sequence shown in FIGS. 4A to 4E is repeated again from the focus detecting operation (Step S15). Moreover, when the switch 124a is off, it is considered that the photographer has released his/her finger from the release button 124 so as to complete the photographing operation. In this case, the sequence processor 100 transmits the operation pausing command L_spd to the lens unit 2 (Step S33). Thereby, the lens unit 2 is subjected to the operation pausing process, and then comes into the operation pausing state. Furthermore, the body unit 1 also performs the operation pausing process (Step S34), and comes into the operation pausing state (Step S35). Thereafter, the sequence processor 100 returns to Step S2, and waits until the switch 124a is turned on again.

[Setting of Diaphragm Value]

Next, a method for setting the diaphragm value in the single-lens reflex camera system will be described. There are roughly two types of methods for setting the diaphragm value in the single-lens reflex camera system of the present embodiment. Firstly, as shown in FIG. 9A, when a diaphragm setting member such as the diaphragm ring 208 is mounted on the lens unit 2, the diaphragm value can be set in the lens unit 2 by rotating the diaphragm ring 208. On the other hand, when the lens unit having no diaphragm ring is attached to the body unit 1, the diaphragm value can be set in the body unit 1.

Next, the diaphragm setting method will be described in detail, however, since the diaphragm setting method by using the diaphragm ring 208 is known as shown in FIG. 9A, the description thereof will be omitted. Hereinafter, a configuration that allows to set the diaphragm value in the body unit 1 will be described below.

FIG. 5 is a side view showing the body unit 1, which illustrates a face (backside face) thereof on the photographer side at the time of photographing. On the backside face of the body unit 1, the displaying portion 105, the diaphragm setting portion 122 and the rotation operator 123 are provided. The below description is based on the precondition that the lens unit 2 having no diaphragm setting portion 207 or the diaphragm ring 208 is attached to the body unit 1.

The diaphragm setting portion 122 is composed of a push button. By operating the diaphragm setting portion 122, the camera system can be transferred into a diaphragm setting mode (a mode that can perform the diaphragm setting at the rotation operator 123). In the present embodiment, by operating the diaphragm setting portion 122 once, the diaphragm setting mode can be effective, and by operating the diaphragm setting portion 122 once more, the diaphragm setting mode can be ineffective. Herein, the diaphragm setting mode denotes a mode that can set the diaphragm value in the body unit 1.

The rotation operator 123 is disposed on the backside face of the body unit 1, and can be rotated in a direction of an arrow E or an arrow F. Herein, the rotation operator 123 may be configured to generate clicking touches at a certain interval, thereby improving the operation feel. Moreover, in the present embodiment, by disposing the diaphragm setting portion 122 near a left edge of the backside face of the body unit 1 and disposing the rotation operator 123 near a right edge of the backside face, as shown in FIG. 5, the photographer can operate the diaphragm setting portion 122 by using a finger of his/her left hand, and can rotate the rotation operator 123 by using a finger of his/her right hand. According to such an arrangement, the photographer can use his/her both hands so as to perform a favorable operation. However, the positions of the diaphragm setting portion 122 and the rotation operator 123 are not limited to these. Moreover, the present embodiment has a configuration where the diaphragm setting mode is switched to be effective/ineffective each time when operating the diaphragm setting portion 122, but may have a configuration where the diaphragm setting mode is effective only while the photographer continues to push the diaphragm setting portion 122.

In FIG. 5, firstly, in the case where the lens unit 2 is attached to the body unit 1, when setting the diaphragm value, the diaphragm setting portion 122 is operated so as to transfer into the diaphragm setting mode.

Specifically, by pushing the diaphragm setting portion 122, the displaying portion 105 displays an image imitating the diaphragm ring 208, as shown in FIG. 5. In the image, a diaphragm value 125 that can be set (the diaphragm value that is printed on the diaphragm ring 208) is included. Moreover, a mark 126 is displayed near the diaphragm value 125, and the presently set diaphragm value is displayed as its position thereof is in accordance with the position of the mark 126. For example, FIG. 5 illustrates that the present diaphragm value is "F4.0". In the displayed image, "50 mm F1.4" denotes a lens spec of the lens unit 2.

After transferring into the diaphragm setting mode, by rotating the rotation operator 123 in the direction of the arrow E or the arrow F, the image imitating the diaphragm ring 208 that is displayed on the displaying portion 105 is scrolled in the same direction as the rotating direction of the rotation operator 123. Herein, in the present embodiment, the diaphragm value can be increased by rotating the rotation operator 123 in the direction of the arrow E, and can be decreased by rotating the rotation operator 123 in the direction of the arrow F. That is, the direction of the arrow F shown in FIG. 5 is made substantially the same as the direction of the arrow K shown in FIG. 9A, and the direction of the arrow E shown in FIG. 5 is made substantially the same as the direction of the arrow L shown in FIG. 9A.

Moreover, the position of a desired diaphragm value, among the displayed diaphragm values, is made in accordance with the position of the mark 126, and then the body unit 1 transmits a command to the lens unit 2 to drive the diaphragm portion 206. By the input command, the lens unit 2 drives the diaphragm portion 206 and sets the diaphragm value to the desired value.

As mentioned above, the direction of the arrow F shown in FIG. 5 is made substantially the same as the direction of the arrow K shown in FIG. 9A, and the direction of the arrow E shown in FIG. 5 is made substantially the same as the direction of the arrow L in FIG. 9A, whereby the photographer can perform the operation with the same sense, by using either the diaphragm ring 208 or the rotation operator 123. Thus, the operation does not deteriorate.

Figure 6A:
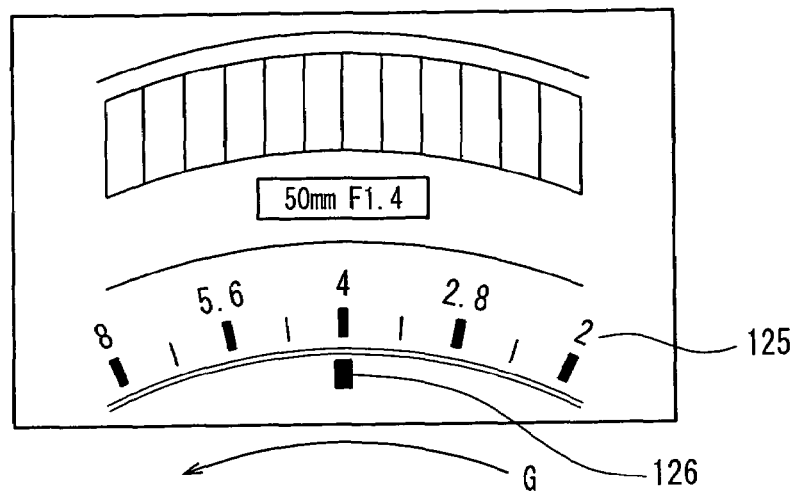
FIG. 6A is a schematic view showing contents displayed on the displaying portion when setting a diaphragm value in a body unit.
Figure 6B:
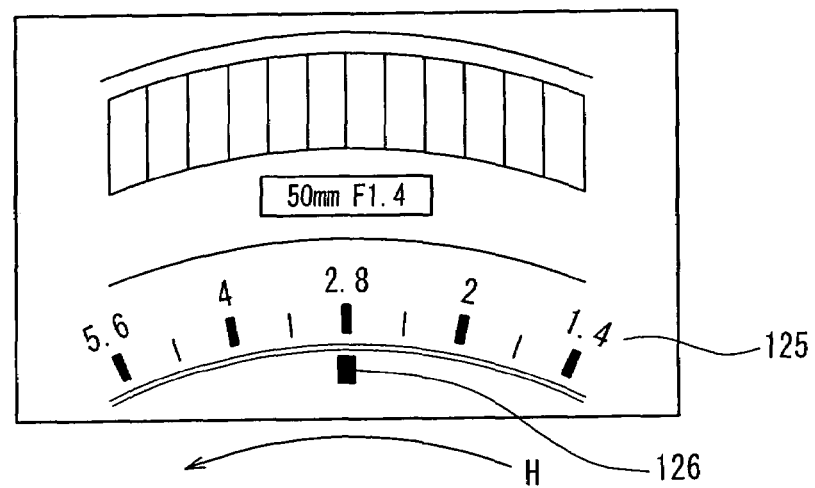
FIG. 6B is a schematic view showing contents displayed on the displaying portion when setting the diaphragm value in the body unit.
Figure 6C:
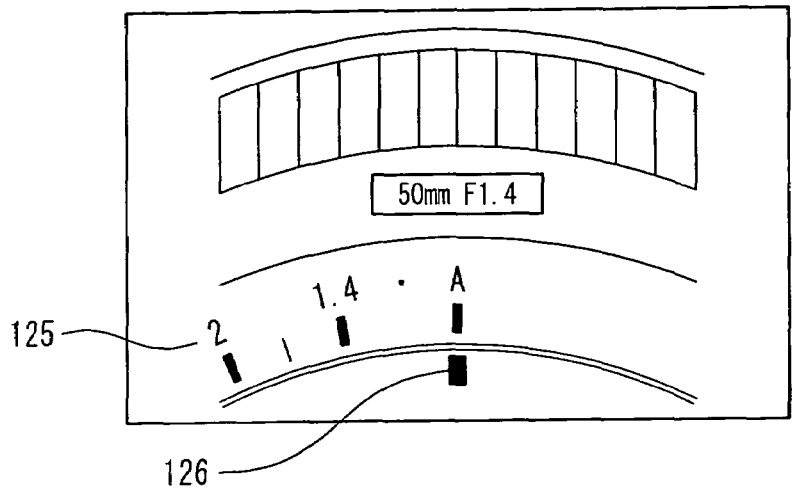
FIG. 6C is a schematic view showing contents displayed on the displaying portion when setting the diaphragm value in the body unit.

FIGS. 6A to 6C show a transition of the image displayed on the displaying portion 105 while performing a diaphragm value setting operation. Firstly, as shown in FIG. 6A, the rotation operator 123 is rotated from the initial state of being set at "F4.0" in the direction of the arrow E (see FIG. 5) by an angle corresponding to two clicks, and then the displayed diaphragm value is moved in a direction of an arrow G by two scales so as to be set at "F2.8" as shown in FIG. 6B. The rotation operator 123 is rotated from the state shown in FIG. 6B in the direction of the arrow E by an angle corresponding to five clicks, and then the displayed diaphragm value is moved in a direction of an arrow H by five scales, thereby being set at the automatically setting mode that is printed as "A" shown in FIG. 6C.

Moreover, the rotation operator 123 is rotated in the direction of the arrow F, and then the image displayed on the displaying portion 105 is scrolled in a direction that is reverse to the direction of the arrow G or the arrow H.

Moreover, in the state shown in FIG. 6C, the image displayed on the displaying portion 105 cannot be scrolled, even when the rotation operator 123 is further rotated in the direction of the arrow E.

As mentioned above, by allowing the displaying portion 105 to display the image imitating the diaphragm ring 208, and making the scrolling direction (the direction of the arrow G or the arrow H) of the displayed image substantially the same as the rotation operating direction (the direction of the arrow E or the arrow F) of the rotation operator 123, the diaphragm value can be set with the same sense as that of rotating the diaphragm ring 208, even when a lens unit having no diaphragm value setting portion is attached to the body unit 1.

Figure 7:
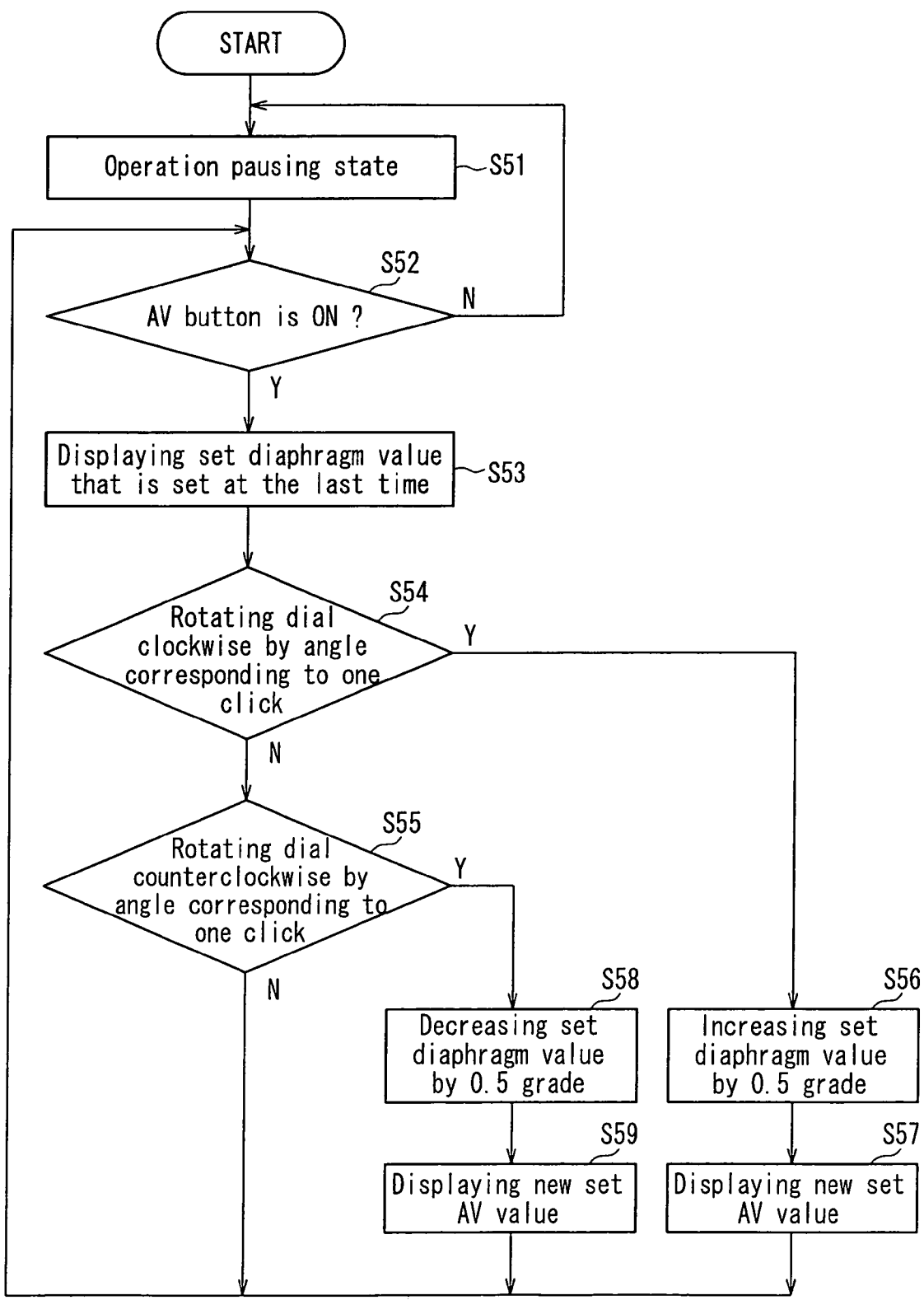
FIG. 7 is a flow chart showing a flow of setting the diaphragm value in the body unit.

FIG. 7 is a flow chart showing the diaphragm value setting operation in the body, when the lens unit having no diaphragm setting portion is attached.

In FIG. 7, firstly, when the camera system is in the operation pausing state (Step S51), the diaphragm setting portion 122 is operated (Step S52), thereby displaying the set diaphragm value that has been set previously (Step S53).

Next, when the rotation operator 123 is rotated clockwise by an angle corresponding to one click (Step S54), the diaphragm portion 206 in the lens unit 2 is controlled so as to increase the set diaphragm value by 0.5 grades (Step S56). Moreover, the display of the diaphragm value 125 on the displaying portion 105 is scrolled clockwise, and a newly set diaphragm value is displayed so that a position thereof is in accordance with the position of the mark 126 (Step S57).

Moreover, the rotation operator 123 is rotated counterclockwise by an angle corresponding to one click (Step S55), and then the diaphragm portion 206 in the lens unit 2 is controlled so as to decrease the set diaphragm value by 0.5 grades (Step S58). Furthermore, the display of the diaphragm value 125 on the displaying portion 105 is scrolled counterclockwise, and a newly set diaphragm value is displayed so that a position thereof is in accordance with the position of the mark 126 (Step S59).

Herein, the diaphragm value that can be set is limited to a range from the open diaphragm value (diaphragm value=1.4) to the minimum diaphragm value (diaphragm value=22), which is not illustrated in the flow chart in FIG. 7 though. Moreover, the rotation operator 123 can be set at the A-position (the automatically setting mode), when being further rotated counterclockwise by an angle corresponding to one click from the state of indicating the open diaphragm value.

As mentioned above, according to the present embodiment, the body unit 1 is provided with the rotation operator 123 that can set the diaphragm value, whereby the diaphragm value can be set, even in the case where the lens unit having no diaphragm ring is attached to the body unit 1.

Moreover, it is configured that, when setting the diaphragm value in the body unit 1, the displaying portion 105 displays the image imitating the diaphragm ring 208, and the display is scrolled so as to be linked with the operation of the rotation operator 123, and furthermore, a scrolling direction thereof is made substantially the same as the operating direction of the rotation operator 123, whereby the operation can be improved.

Moreover, in the case where the first lens unit (the lens unit having no diaphragm ring 208) is attached to the body unit 1, when setting the diaphragm value, the operation of the diaphragm ring 208 is made effective and the operation of the rotation operator 123 is made ineffective, whereby the set value of the diaphragm ring 208 always corresponds with the set value of the diaphragm portion 206, which is not likely to mislead the user about the operation.

The present embodiment has a configuration where, when setting the diaphragm value, in the case where the first lens unit is attached to the body unit 1, the operation of the diaphragm ring 208 is made effective and the operation of the rotation operator 123 is made ineffective, but may have a configuration where both of the diaphragm ring 208 and the rotation operator 123 are made effective. According to such a configuration, the user can select the more appropriate operating means from the diaphragm ring 208 and rotation operator 123 for the operation. In the case of adopting this configuration, by setting the operator that is operated for the last time, which is either the diaphragm ring 208 or the rotation operator 123, to be operated at the time of the next operation with higher priority, the operation is improved further. Moreover, since the operating direction (rotating direction) of the diaphragm ring 208 and the operating direction (rotating direction) of the rotation operator 123 are made substantially the same, the user can operate with the same sense by using either the diaphragm ring 208 or the rotation operator 123, whereby the operation does not deteriorate. Moreover, if the first lens unit is replaced with the second lens unit (the lens unit having no diaphragm ring), the operating direction of the rotation operator 123 is not changed, whereby the operability does not deteriorate.

Moreover, the information on the diaphragm value (diaphragm data) displayed on the displaying portion 105 is not limited to the displayed image as shown in FIG. 5 and the other figures. For example, in a state where the displaying portion 105 displays a through image, the numeric value representing the diaphragm value may be displayed superimposed on the through image by using an on-screen display function. In the case of displaying in such a way, it may be configured so that the numeric value displayed on the displaying portion 105 is changed sequentially in accordance with the operation of the rotation operator 123. According to such a configuration, brightness of the through image also is varied so as to be linked with the operation of the rotation operator 123, and thus the user can visually recognize brightness of the image to be photographed, while recognizing the diaphragm value.

The present invention enables use of a lens having the diaphragm value setting portion with high operability in a lens unit, and facilitates the setting of the diaphragm value visually also in a lens having no operator in a lens unit, which accordingly can be applied to a single-lens reflex camera system.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A single-lens reflex camera body to which a first lens unit provided with a diaphragm ring that is capable of adjusting a diaphragm value by a rotating operation, and a second lens unit tat is not provided with the diaphragm ring can be attached/detached selectively,
   the single-lens reflex camera body comprising:
   a rotation operator that accepts a rotating operation to adjust a diaphragm value of the first lens unit or the second lens unit that is attached to the singe-lens reflex camera body; and
   a controller that transmits the diaphragm value that is adjusted at the rotation operator to the first lens unit or the second lens unit that is attached to the single-lens reflex camera body,
   wherein an operating direction of the diaphragm ring when a rotating operation is performed at the diaphragm ring to increase the diaphragm value is substantially in the same direction as an operating direction of the rotation operator when the rotating operation is performed at the rotation operator to increase the diaphragm value.

2. The single-lens reflex camera body according to claim 1, comprising a detector that detects which of the first lens unit or the second lens unit is attached to the single-lens reflex camera body,
   wherein, when the detector detects that the second lens unit is attached to the single-lens reflex camera body, the controller transmits a diaphragm value that is adjusted at the rotation operator to the second lens unit that is attached to the single-lens reflex camera body.

3. The single-lens reflex camera body according to claim 1, comprising a displaying portion, wherein, when the rotation operator accepts the rotating operation for adjusting the diaphragm value, the displaying portion displays an image showing an appearance of the diaphragm ring.

4. The single-lens reflex camera body according to claim 1, further comprising an automatically setting mode to calculate the diaphragm value by at least a light amount of the subject to be photographed or a setting of a shutter speed,
   wherein the automatically setting mode can be selected at the rotation operator.

5. A lens unit that is capable of being attached/detached with respect to the single-lens reflex camera body according to claim 1 and capable of performing data communication with the single-lens reflex camera body,
   the lens unit comprising:
   a diaphragm portion that is disposed on an optical axis of an incident optical image, and can limit a light amount to be passed through; and
   a diaphragm sewing portion that controls to drive the diaphragm portion, based on data of the diaphragm value transmitted from the single-lens reflex camera body.

6. A single-lens reflex camera system comprising a single-lens reflex camera body; and a lens unit,
   wherein the lens unit is a first lens unit provided with a diaphragm ring that is capable of adjusting a diaphragm value by a rotating operation; or a second lens unit that is not provided with the diaphragm ring, being capable of being attached/detached with respect to the single-lens reflex camera body and capable of performing data communication with the single-lens reflex camera body,
   wherein the lens unit includes:
   a diaphragm setting portion that controls driving the diaphragm portion based on a diaphragm value transmitted from the single-lens reflex camera body,
   wherein the single-lens reflex camera body includes:
   a rotation operator that accepts a rotating operation to adjust the diaphragm value of the first lens unit or the second lens unit that is attached to the single-lens reflex camera body; and
   a controller that transmits the diaphragm value that is adjusted at the rotation operator to the first lens unit or the second lens unit that is attached to the single-lens reflex camera body,
   wherein an operating direction of the diaphragm ring when the rotating operation is performed at the diaphragm ring to increase the diaphragm value is substantially in the same direction as an operating direction of the rotation operator when the rotating operation is performed at the rotation operator to increase the diaphragm value.

* * * * *